(12) United States Patent
Cross

(10) Patent No.: US 6,250,874 B1
(45) Date of Patent: Jun. 26, 2001

(54) CARGO RAMP

(76) Inventor: Jeffrey M. Cross, 122 Hickory Trail, Cumming, GA (US) 30130

( * ) Notice: Subject to any disclaimer, the term of this patent is extended or adjusted under 35 U.S.C. 154(b) by 0 days.

(21) Appl. No.: 09/550,610

(22) Filed: Apr. 17, 2000

(51) Int. Cl.$^7$ .................................................. B65G 67/02
(52) U.S. Cl. .............................................. 414/537; 296/61
(58) Field of Search ................................ 414/537; 296/61

(56) References Cited

U.S. PATENT DOCUMENTS

| | | | |
|---|---|---|---|
| 4,874,284 | * 10/1989 | New, Jr. | 414/537 |
| 5,096,362 | * 3/1992 | Best | 414/537 |
| 5,458,389 | * 10/1995 | Young | 296/26 |
| 5,649,732 | * 7/1997 | Jordan et al. | 414/537 X |
| 5,971,465 | * 10/1999 | Ives et al. | 414/537 X |
| 6,076,215 | * 6/2000 | Blankenship et al. | 14/71.1 |

* cited by examiner

*Primary Examiner*—Steven A. Bratlie
(74) *Attorney, Agent, or Firm*—Harry I. Leon; Vivian L. Steadman

(57) ABSTRACT

A ramp assembly for loading/unloading pickup trucks which includes at least one pair of hinged panel members across which, when fully extended, cargo can be transferred. Mounted on a truck in such a way that both panel members are disposed rearwardly of its open tailgate, the ramp assembly includes a "T"-shaped support and a "L"-shaped hitch arm. In the latter, two branches of disparate length extend perpendicularly to each other. The longer branch is slideably engageable with a conventional class II or, alternately, class III hitch receiver; the shorter terminates in a transverse opening. Prior to use, the "T"-shaped support, upon its having a leg thereof inserted through this opening, is coupled with the shorter branch. Secured atop the support are bearing posts which extend upwardly therefrom and define holes for slideably receiving an elongated shaft. Likewise, the pair of panel members terminate, at one end, in plates which define holes for slideably receiving the shaft so that not only can the panel members be rotatably supported thereon but also their position relative to the bearing posts can be varied horizontally. To lock the panel members in a fully extend position, two hollow cylinders, each mounted on a different panel member, and a pin slideably engageable with them are utilized. During storage, the panels can be secured in an upwardly folded position behind the tailgate.

7 Claims, 5 Drawing Sheets

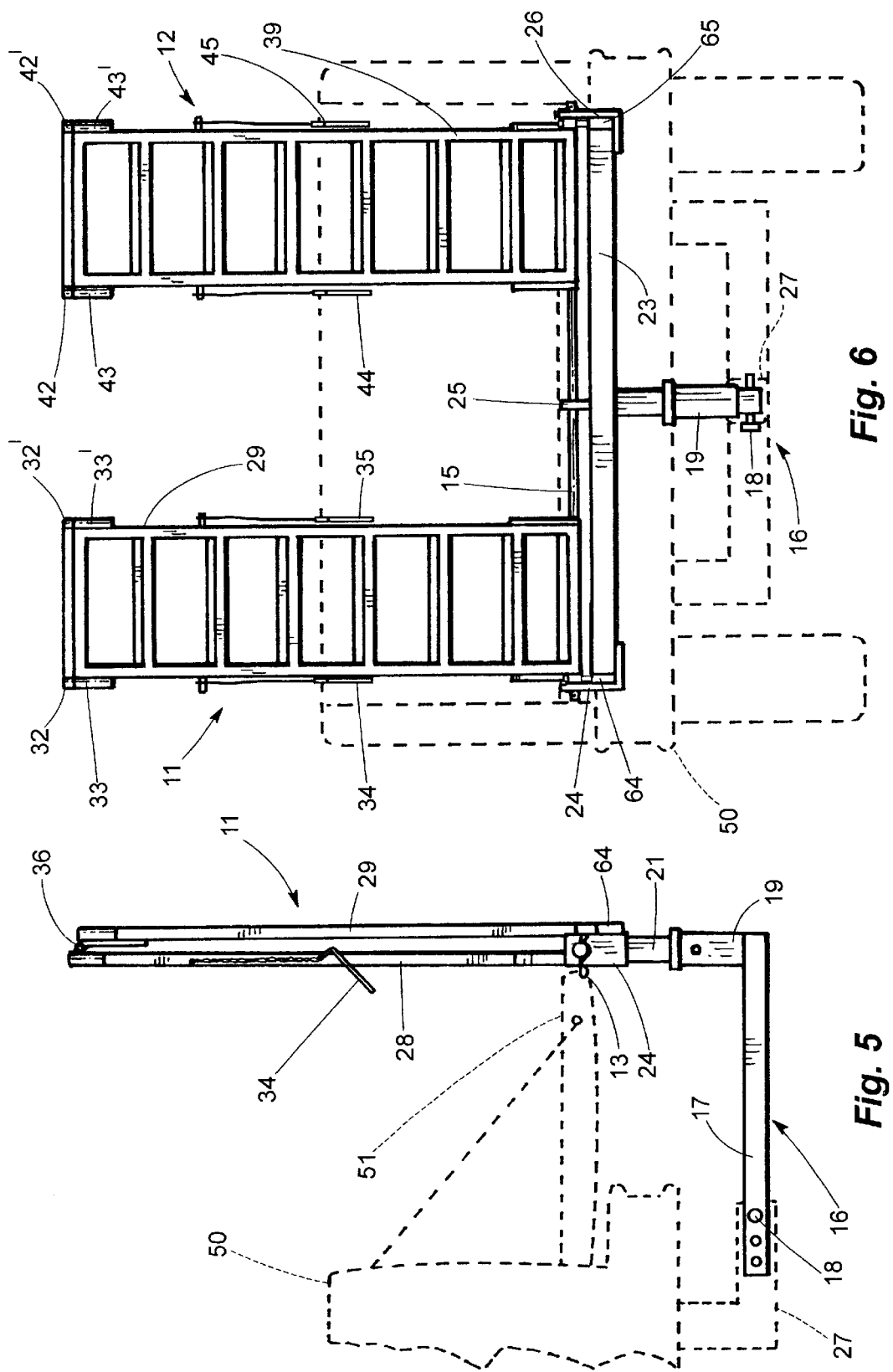

CARGO RAMP

BACKGROUND OF THE INVENTION

For as long as pickup trucks have existed, there has been a need for a ramp to load/unload them. In the past, such ramps were attached to truck tailgates. Alternately, the tailgate itself was removed; and the ramp, when not in use, was folded upwardly in place of the tailgate. But matching a ramp with the body of a particular vehicle is difficult, and truck owners are generally reluctant to permanently alter their vehicles.

An approach which requires substantially less alteration entails the use of heavy steel bumpers. Once commonplace, such bumpers can serve as a convenient structure on which to attach a ramp. Dudley, in U.S. Pat. No. 4,795,304, for example, uses the rear bumper for this purpose. But with the advent of plastic bumpers, his type of ramp support lost favor. Indeed, without a heavy steel structure, bumpers no longer can be used to mount a ramp or even a conventional towing ball.

In response to unmet towing needs, a combination trailer hitch receiver/hitch arm, in which the hitch receiver is fastened to the undercarriage of a vehicle, was subsequently developed. Such a hitch receiver is now available at relatively low cost for nearly all truck models. Two versions currently dominate the market. Classes II and III hitch receivers present a 1–¼ inch by 2 inch rectangular opening and a 2 inch square opening, respectively, into which one end of an appropriately sized hitch arm can be slip-fitted. Once the hitch arm has been so slip-fitted, two sets of openings, located in the hitch receiver and arm, respectively, can be brought into alignment, so that a locking pin can be inserted therethrough and employed to hold the hitch receiver and arm in assembled relation. In a popular version of the hitch arm, a towing ball is mounted on the end thereof distal from the hitch receiver.

But none of the prior art hitch arm/hitch receiver combinations provides for a ramp which can be used to load and unload a pickup truck.

SUMMARY OF THE INVENTION

The object of the present invention is to provide a ramp assembly which can be mounted on a pickup truck or similar vehicle without modifying its tailgate, bed or bumper.

A further object of the present invention is to provide such a ramp assembly which neither interferes with the use of the truck nor hinders the opening or closing of its tailgate when the ramp is in its stored position.

In accordance with the present invention, there is provided a ramp assembly having a "L"-shaped hitch arm with two branches, one of which is longer than the other. The elongated branch can be adjustably slip-fitted into a class II, or, alternately, into a class III, hitch receiver when the latter is attached to the frame of a pickup truck or the like. A hitch pin is utilized to hold the hitch arm and receiver in assembled relation. Supported by the hitch receiver, the "L"-shaped hitch arm is held in such a way that its second, shorter branch extends rearwardly of the truck tailgate. Distal from the hitch receiver, the shorter branch terminates in an opening which is disposed transversely to its longitudinal centerline.

The improved ramp assembly further comprises a "T"-shaped support having a horizontal bar and one leg which extends downwardly therefrom. Prior to use, the leg is inserted into the transverse opening in the shorter branch, slideably engaging it. Secured atop this horizontal bar are at least two bearing posts which extend upwardly therefrom and are spaced apart from each other. Holes defined by the posts are aligned with each other so that they can slideably receive an elongated shaft.

The improved ramp assembly still further comprises at least one set of first and second panel members which are hinged together and foldable. The transverse width of the first panel member, at the end thereof distal from the hinged joint, is less than the distance separating any two contiguous bearing posts on the "T"-shaped support. Together the panel members define a structure across which, when they are locked in a fully extended position, cargo can be transferred. Formed integrally with the distal end of the first panel member is a pair of plates, each of which defines a hole for slideably receiving the elongated shaft upon which the hinged panel members are rotatably supported.

In the preferred embodiment, means for locking the panel members in a fully extended position includes a pair of hollow cylinders and a pin slideably engageable therewith. Mounted in tandem proximate with the hinged joint, one of the cylinders is rigidly attached to the first panel member and other to the second panel member. When the hinged panel members are fully extended, the longitudial centerlines of the two cylinders are aligned, so that the pin can be inserted into both of them simultaneously, locking the panel members in position.

In the preferred embodiment, the improved ramp assembly comprises two sets of first and second panel members separated by a third bearing post. The first panel member in each set is then slideable along the elongated shaft, so that the spacing between the two sets of panel members can be adjusted to accommodate widely varying cargo widths.

To facilitate storage, the panels can be secured in an upwardly folded position behind the tailgate of the vehicle on which the improved ramp assembly is mounted. Whether in their folded position or otherwise, the panels do not interfere with opening or closing the tailgate. Alternately, when the ramp assembly is not in use, it can be removed by pulling the hitch pin and disengaging the hitch arm from the hitch receiver.

BRIEF DESCRIPTION OF THE DRAWINGS

FIGS. 5 and 6 are right side and rear elevational views, respectively, of the cargo ramp according to FIG. 1, the ramp being shown in its folded position.

DETAILED DESCRIPTION OF THE PREFERRED EMBODIMENT

Figure 1:
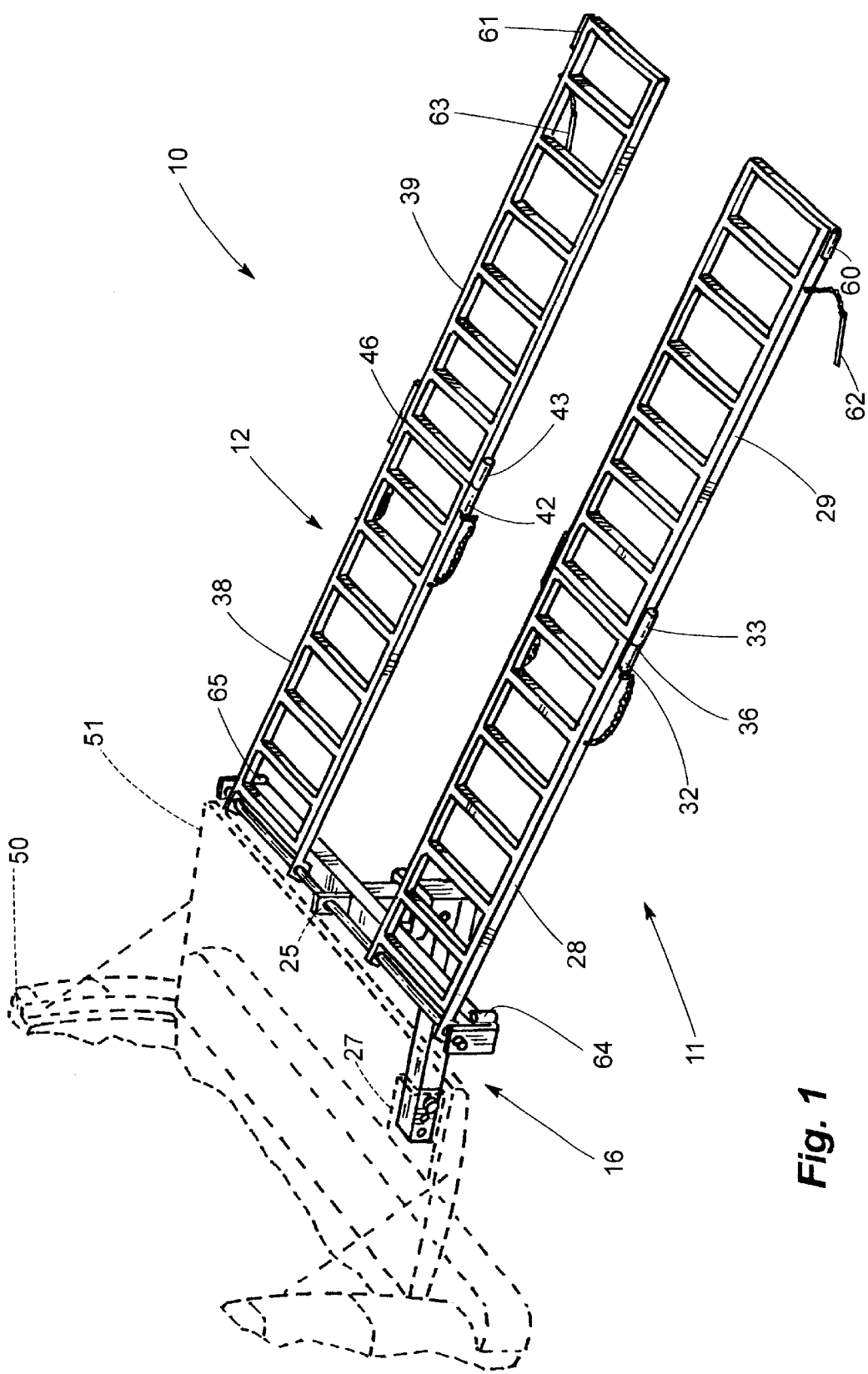
FIG. 1 is a right hand perspective view of the cargo ramp according to the present invention, mounted on a vehicle, frag-mentary portions of the vehicle and of the hitch receiver, which are indicated by dashed lines in FIG. 1, as well as in FIGS. 3 through 6, being shown for illustrative purposes only and forming no part of the claimed invention.
Figure 3:
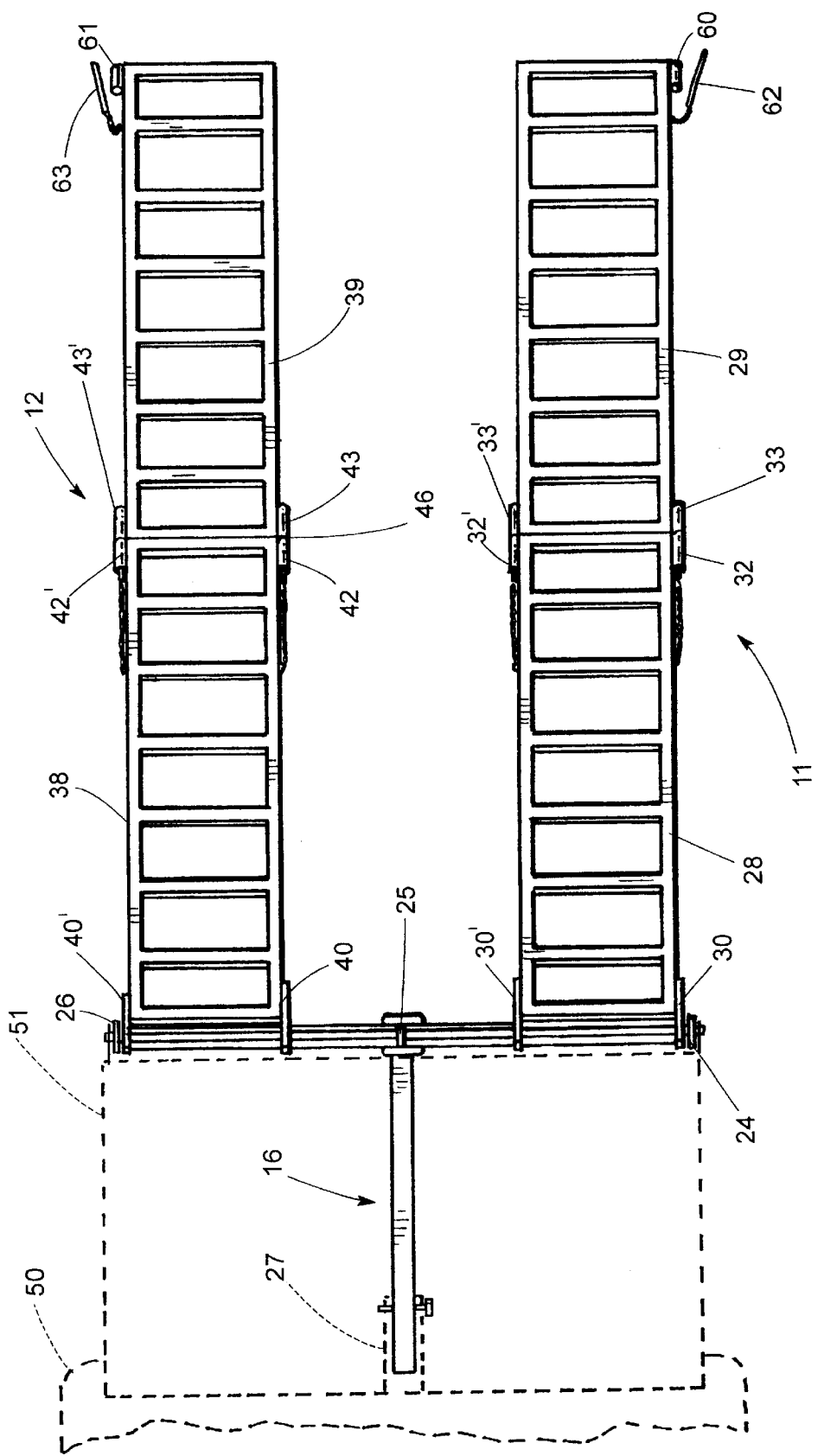
FIGS. 3 and 4 are plan and elevated views of the cargo ramp according to FIG. 1, the ramp being shown in its working position.
Figure 4:
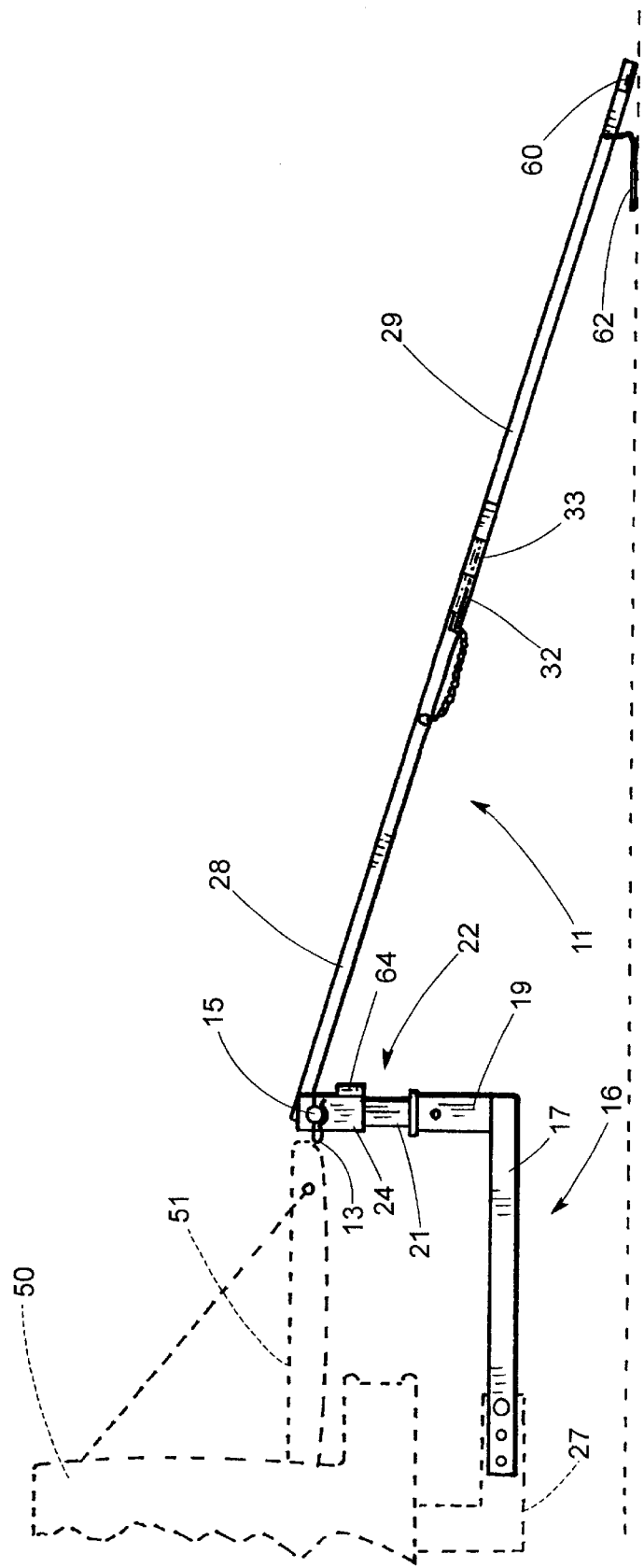

A ramp assembly indicated generally by the reference numeral 10 comprises a "L"-shaped hitch arm 16, a "T"-shaped support 22, and at least two sets 11, 12 of paired panel members 28, 29; 38, 39, respectively. The panel members 28 and 29; 38 and 39 are hinged together and foldable upwardly (FIGS. 1, 2, 3 and 6). In the preferred embodiment, each of them defines a ladder-type structure across which, when the panel members are fully extended, cargo can be transferred (FIGS. 1, 3 and 4). Alternately, other weight-bearing structures can be utilized to form the panel members; and these structures can be left open, covered with expanded metal, or provided with a smooth upper surface. Measuring, by way of example, 6.8 feet in length by 1.0 feet in width, the panels 28, 38; 29, 39 are approximately 1.0 inches thick and are fabricated from aluminum, steel or the like.

Figure 2:
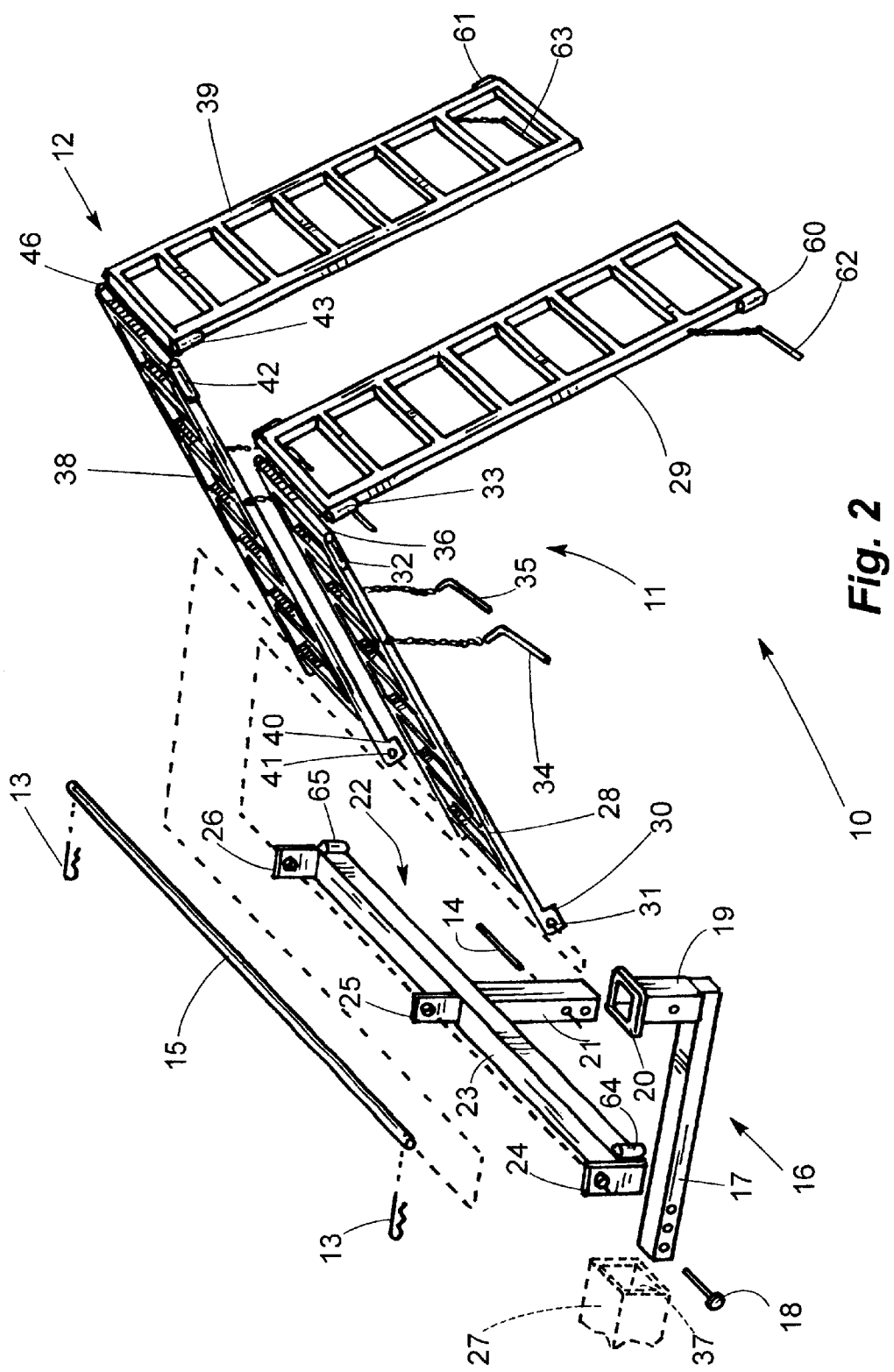
FIG. 2 is an exploded perspective view of the cargo ramp according to FIG. 1.

Suspended above the "T"-shaped support 22 on bearing posts 24, 25, 26 affixed to bar 23 is an elongated shaft 15 (FIGS. 1, 2 and 6). Contiguous posts 24 and 25; 25 and 26 are spaced apart from each other by a distance greater than the transverse width of each panel member 28, 38, so that the ends of these panel members can be mounted therebetween. Further, the panel members 28, 38 terminate in paired plates 30, 30'; 40, 40', respectively, which define holes 31, 41 for slideably receiving the elongated shaft 15 (FIGS. 2 and 3). Clips 13, which are retained within holes formed in the distal ends of the shaft 15 hold it, the posts 24, 25, 26 and the panel members 28, 38 in assembled relation (FIG. 2).

As is best illustrated in FIGS. 2, 4 and 5, the "T"-shaped support 22, coupled with the hitch arm 16, comprises means for attaching the panel sets 11, 12 to a pickup truck 50. With its elongated branch 17 slip-fitted, through transverse opening 37, into a hitch receiver 27 and held in position there by a first hitch pin 18, the hitch arm 16 can be used to mount the support 22. In the preferred embodiment, a class II hitch receiver 27 is utilized; alternately, a class III hitch receiver is employed, so that a wide variety of trucks can be fitted with the ramp assembly 10.

Anchored to the hitch receiver 27, the hitch arm 16 presents an upwardly extending branch 19 (FIG. 2). The latter defines a transverse opening 20 into which a leg 21 of the support 22 is inserted prior to use (FIG. 2). Holding the hitch arm 16 and support 22 in assembled relation is a second hitch pin 14. The pin 14 is inserted simultaneously into paired holes selected from a series of holes formed in the leg 21 and a pair of like-sized holes in the branch 19 so that the overall height of the ramp assembly 10 can be adjusted to match that of the tailgate 51 (FIG. 4). Similarly, a series of holes which are formed in the elongated branch 17 of the hitch arm 16 and which are alignable with pairs of like-sized holes in the hitch receiver 27 is provided, so that the first hitch pin 18 can be inserted therein, allowing one to adjust the rearward horizontal extension of the ramp assembly 10. Thus can the panel members 28, 38 be attached to the truck 50 in such a way that they are disposed rearwardly of its open tailgate 51.

In the preferred embodiment, hinged panel members 28, 29 are locked in a fully extended position with the use of two pairs of hollow cylinders 32, 33; 32', 33' and pins 34, 35 slideably engageable therewith (FIGS. 2 and 3). Mounted in tandem proximate with the hinged joint 36, one cylinder 32, 32' in each of these pairs is rigidly attached to the first panel member 28 and the other to the second panel member 29. When the panel members 28, 29 are fully extended, the longitudinal centerlines of the two cylinders 32 and 33; 32' and 33' are aligned, so that the pin 34, 35, respectively, can be inserted into both of them simultaneously, locking the panel members in position. Similarly, two pairs of hollow cylinders 42 and 43; 42' and 43' are mounted in tandem proximate with the hinged joint 46 between the panel members 38, 39 so that they can be locked in a fully extended position using pins 44, 45 slideably engageable with these hollow cylinders (FIGS. 2 and 3).

Storage of the panels 28, 29; 38, 39 in the ramp assembly 10 is readily accomplished by folding them upwardly about their respective hinges 36, 46 (FIGS. 5 and 6). So folded, they can be secured in an upright position behind tailgate 51 and out of its way. In the preferred embodiment, the panel member 28, 29; 38, 39 are kept in a folded position using a mechanism similar to that employed to lock them in a fully extended position. Affixed to the distal end of each panel member 29, 39 is a hollow cylinder 60, 61 which, when the panel set is folded, aligns itself with another hollow cylinder 64, 65, respectively, mounted on the horizontal bar 23 so that a pin 62, 63 can be inserted through the aligned pair of cylinders 60 and 64; 61 and 65 simultaneously, removably fastening them together (FIGS. 2 through 5).

When the ramp assembly 10 is not in use, it can be easily removed from the hitch receiver 27 by pulling out the hitch pin 18 and disengaging the hitch arm 16.

It is understood that those skilled in the art may conceive other applications, modifications and/or changes in the invention described above. Any such applications, modifications or changes which fall within the purview of the description are intended to be illustrative and not intended to be limitative. The scope of the invention is limited only by the scope of the claims appended hereto.

It is claimed:

1. A ramp assembly for installation on a pickup truck having a hitch receiver and a tailgate, which comprises:
   (a) at least one pair of hinged first and second panel members;
   (b) a "L"-shaped hitch arm having first and second branches which extend perpendicularly to each other, the first branch being slideably engageable engageable with the hitch receiver, the second branch defining a transverse opening at points thereon distal from the first branch;
   (c) a "T"-shaped support having an elongated bar and a leg which extends perpendicularly therefrom and which, when inserted into the transverse opening, slideably engages the second branch;
   (d) an elongated shaft;
   (e) at least two bearing posts attached to the elongated bar which extend upwardly therefrom and define a first set of holes for slideably receiving the elongated shaft;
   (f) the first panel member including a ladder-like structure, the structure having a pair of elongated side members and a pair of rigid plates which are formed integrally therewith and extend longitudinally therefrom, the plates being disposed distal from the second panel member, the plates defining a second set of holes for slideably receiving the elongated shaft, so that the hinged panel members can be rotated about the elongated shaft and slid sidewise along said shaft; and
   (g) the ladder-like structure having a plurality of rungs, including first and second rungs, the first rung being disposed in close proximity to the shaft; upper surfaces of the rungs defining an imaginary plane, the shaft being disposed downwardly of said plane.

2. A ramp assembly adapted for vehicles having a tailgate and a hitch receiver, comprising:
   (a) at least one elongated rectangular panel member;
   (b) means, connected only to the hitch receiver, for rotatably supporting one end of the panel member, said end being slideable laterally when the panel member is rotatably supported, the panel member including a ladder-like structure, the ladder-like structure including first and second rungs, the first rung being disposed proximate with said end of the panel member; upper surfaces of the rungs defining an imaginary plane, the rotatably supporting means being disposed downwardly of said plane.

3. The ramp assembly according to claim 2, wherein the means for rotatably supporting one end of the panel member further comprises a "L"-shaped hitch arm and a "T"-shaped support, the hitch arm having first and second branches which extend perpendicularly to each other, the first branch being slideably engageable with the hitch receiver, the second branch, when the first branch is so engaged, extending upwardly therefrom and rearwardly of the tailgate, the second branch defining a transverse opening at points thereon distal from the first branch; the "T"-shaped support having a leg which, when inserted into the transverse opening, slideably engages the second branch, so that the tailgate can be freely operated even when the ramp assembly is in use.

4. The ramp assembly according to claim 2, wherein the means for rotatably supporting one end of the panel member further comprises an elongated horizontal shaft and a pair of plates affixed to one end of the panel member, the plates defining a set of holes for slideably receiving the elongated shaft, so that the panel member can be slid sidewise along the horizontal shaft.

5. The ramp assembly according to claim 4, which further comprises two panel members, one end of each panel member being rotatably supported on the elongated horizontal shaft, so that spacing between proximate edges of the panel members can be varied.

6. The ramp assembly according to claim 2, wherein the elongated panel member comprises two sections of substantially equal length which are hinged to each other transversely, so that the sections can be folded for ease of storage, and which further comprises means for holding the two sections, when folded, in a generally vertical position rearwardly of the tailgate.

7. The ramp assembly according to claim 6, wherein the means for rotatably supporting one end of the panel member further comprises a "L"-shaped hitch arm and a "T"-shaped support, the hitch arm having first and second branches which extend perpendicularly to each other, the first branch being slideably engageable with the hitch receiver; the second branch, when the first branch is so engaged, extending upwardly therefrom and rearwardly of the tailgate, the second branch defining a transverse opening at points thereon distal from the first branch; the "T"-shaped support having a leg which, when inserted into the transverse opening, slideably engages the second branch, so that the tailgate can be freely operated even when the sections of the panel member are folded during storage.

* * * * *